United States Patent Office 3,280,045
Patented Oct. 18, 1966

3,280,045
PROCESS FOR POLYMERIZING EPOXIDES WITH AN ALKYL ALUMINUM COMPOUND
Edwin J. Vandenberg, Wilmington, Del., assignor to Hercules Incorporated, a corporation of Delaware
No Drawing. Filed Feb. 26, 1964, Ser. No. 347,378
15 Claims. (Cl. 260—2)

This application is a continuation-in-part of my application Serial No. 812,079, filed May 11, 1959, and now U.S. 3,135,705, which application is a continuation-in-part of my application Serial No. 738,626, filed May 29, 1958, and now abandoned.

This invention relates to an improved process for the polymerization of epoxides and more particularly to the modification of an organoaluminum-water reaction product used as the catalyst whereby higher yields of a highly crystalline polymer are obtained.

In my copending application Serial No. 812,079 filed May 11, 1959, of which this application is a continuation-in-part, there are described, as new and highly effective catalysts for the polymerization of epoxides, organoaluminum compounds that have been chelated and/or reacted with water, specifically in a molar ratio of water to organoaluminum compound of from about 0.1 to about 1.5.

Now in accordance with this invention it has been found that when certain of these organoaluminum compounds that have been reacted with water are further modified by reaction with an alcohol, phenol or hydrogen halide, and used for the homo- or co-polymerization of alkylene oxides and epihalohydrins, there is obtained an increased yield of crystalline polymer and/or a much more highly crystalline polymer. Trialkyl aluminum compounds that have been reacted with chelating agents such as acetylacetone in a molar ratio of from about 0.01 to about 1.2 and also with water in a molar ratio of from about 0.1 to about 1.0, respectively, are outstanding catalysts for the polymerization of alkylene oxides and epihalohydrins. Surprisingly, it has now been found that when these catalysts are further reacted with an alcohol, phenol or hydrogen halide in a molar ratio of from about 0.5 to about 1.5, respectively, but with less than the number of aluminum-to-carbon bonds remaining in said catalyst, there is obtained an active catalyst which often gives a much higher conversion to crystalline polymer and frequently a much more stereoregular polymer. In other cases, these catalysts are desirable because they yield lower molecular weight, more easily processed products. The catalysts of this invention being generally lower in active aluminum-alkyl groups are less reactive with functional groups and hence are more effective for epoxides containing such reactive groups, as for example, epifluorohydrin, glycidyl esters such as glycidyl acetate, acrylate and methacrylate, etc.

Any trialkylaluminum or dialkylaluminum hydride that has been chelated and reacted with water can be further modified by reaction with an alcohol, phenol or hydrogen halide in accordance with this invention. Exemplary of these trialkylaluminums are trimethylaluminum, triethylaluminum, diethylaluminum hydride, triisobutylaluminum, tri-n-butylaluminum, trioctylaluminum, diisobutylaluminum hydride, etc. While any chelating agent may be reacted with the trialkylaluminum or dialkylaluminum hydride, the diketones, keto- and aldo-oximes, dioximes, and the dicarboxylic acids and their mono- and diesters are preferred in the present case. Exemplary of such classes of chelating agents that can be used are: acetylacetone, trifluoroacetylacetone, acetonylacetone, benzoylacetone, furoylacetone, thenoyltrifluoroacetone, dibenzyl methane, 3-methyl-2,4-pentane - dione, 3 - benzyl - 2,4-pentane-dione, 2,3-butanedione-2-oxime, phenyl glyoxaldoxime, chloroglyoxaldoxime, glyoxal mono-oxime, glyoxime, dimethyl glyoxime, dichloroglyoxime, oxalic acid, malonic acid and the mono- and diesters thereof, etc. The amount of chelating agent reacted with the alkyl-aluminum compound will generally be within the range of from about 0.01 to about 1.2 moles of chelating agent per mole of aluminum and preferably will be from about 0.1 to about 1 mole per mole of aluminum alkyl.

Regardless of the trialkylaluminum or dialkylaluminum hydride compound that is used, it should be reacted with water as set forth above in a molar ratio of from about 0.1 mole of water per mole of organoaluminum compound up to about 1.0 mole of water per mole of aluminum compound. Preferably the molar ratio of water to organoaluminum compound will be in the range of from about 0.2:1 to about 1:1.

Any desired procedure may be used for reacting the organoaluminum compound with the specified molar ratio of water. Generally better results are obtained if the organoaluminum compound and water are prereacted and the reaction product then added to the polymerization mixture. This may readily be done, and preferably is done, by adding the specified amount of water gradually to a solution of the organoaluminum compound in an inert diluent as, for example, a hydrocarbon diluent such as n-hexane, toluene, or an ether such as diethyl ether or a mixture of such diluents. It may also be done in the absence of a diluent. If a chelating agent is used, it may be added before or after reacting with water.

The trialkylaluminum or dialkylaluminum hydride that has been reacted with a chelating agent and with water can then be reacted with any alcohol, phenol or hydrogen halide in accordance with this invention. Any alcohol may be used to modify the catalyst as, for example, aliphatic alcohols such as methanol, ethanol, allyl alcohol, isopropanol, n-butanol, tert-butanol, hexanol, 1-octanol, 2-octanol, 1-decanol, 2,2,2-trifluoroethanol, etc., or cycloaliphatic alcohols such as cyclohexanol, α-terpineol, menthol, α-fenchyl alcohol, borneol, cyclohexandiol, aralkyl alcohols such as benzyl alcohol, and polyhydric alcohols such as ethylene glycol, propylene glycol, glycerine, pentaerythritol, etc. In the same way any phenol may be used as, for example, phenol, resorcinol, a cresol, di-tert. butyl p-cresol, etc. Another class of modifying agents that can be used are the hydrogen halides, namely, hydrogen chloride, hydrogen fluoride, hydrogen bromide and hydrogen iodide. As pointed out above these modifying agents are used in a molar ratio of from about 0.5 to about 1.5 moles per mole of aluminum compound, but must be in an amount less than the number of aluminum-to-carbon bonds remaining in the compound.

The alcohol, phenol, or hydrogen halide reacts with the organoaluminum-water catalyst in a variety of ways. Thus it can be added during or after the addition of the water to the organoaluminum compound, or, if the chelating agent is added after the water, the alcohol, phenol, or hydrogen halide modifier can be added before or after the addition of the chelating agent. It may be added separately as a pure compound or added as a solution in a diluent such as a liquid hydrocarbon, an ether, etc., and the addition can be made all at one time, incrementally, or continuously. The reaction can be carried out with or without a diluent and, in general, will be carried out at a temperature of from about $-80°$ C. to about $200°$ C., preferably from about $-50°$ C. to about $150°$ C. If the additive is added at room temperature or lower, it is often advantageous to heat-treat the catalyst at a temperature of from about $50°$ C. to about $150°$ C. to complete the reaction.

The choice of the modifying alcohol, phenol or hydrogen halide will depend in large part upon the epoxide being polymerized. Thus for a 1,2-alkylene oxide such as propylene oxide, a lower alkanol such as methanol is preferred. For a 2,3-alkylene oxide such as cis-butene oxide, the more hindered alcohols such as cyclohexanol, α-terpineol, borneol, isopropanol, tert-butanol, 2-octanol, etc., are preferred.

The polymerization reaction can be carried out by any desired means, either as a batch or continuous process with the catalyst added all at one time or in increments during the polymerization or continuously throughout the polymerization. If desired, the monomer may be added gradually to the polymerization system. It may be carried out as a bulk polymerization process, in some cases at the boiling point of the monomer (reduced to a convenient level by adjusting the pressure) so as to remove the heat of reaction. However, for ease of operation, it is more generally carried out in the presence of an inert diluent. Any diluent that is inert under the polymerization reaction conditions may be used as, for example, ethers such as the dialkyl, aryl or cycloalkyl ethers as, for example, diethyl ether, dipropyl ether, diisopropyl ether, aromatic hydrocarbons such as benzene, toluene, etc., or saturated aliphatic hydrocarbons and cycloaliphatic hydrocarbons such as n-heptane, cyclohexane, etc., and halogenated hydrocarbons as, for example, chlorobenzene, or haloalkanes such as methyl chloride, ethyl chloride, methylene chloride, chloroform, carbon tetrachloride, ethylene dichloride, etc. Obviously, any mixture of such diluents may be used and in many cases is preferable. For example, when saturated aliphatic hydrocarbons are used as the diluent, it is preferable, particularly if high molecular weight polymers are desired or if very little diluent is present, to use them in admixture with ethers.

The polymerization process in accordance with this invention may be carried out over a wide temperature range and pressure. Usually, it will be carried out at a temperature from about $-80°$ C. up to about $250°$ C., preferably from about $-80°$ C. up to about $150°$ C., and more preferably within the range of about $-30°$ C. to about $100°$ C. Usually, the polymerization process will be carried out at autogenous pressure, but superatmospheric pressures up to several hundred pounds may be used if desired and, in the same way, subatmospheric pressures may also be used.

Any epoxide can be homopolymerized or copolymerized with a second epoxide with the improved catalysts in accordance with this invention. Thus any alkylene oxide, halo-alkylene oxide, cycloaliphatic epoxide, epoxy ether, as for example, the alkyl glycidyl ethers, aryl glycidyl ethers, unsaturated glycidyl ethers, glycidyl esters, ethylenically unsaturated epoxides such as butadiene monoxide, etc., can be polymerized with these catalysts. However, they are of particular importance in the polymerization of alkylene oxide and epihalohydrins, including homopolymerization thereof and copolymerization with one another. Exemplary of the alkylene oxides and epihalohydrins that can be so polymerized are epichlorohydrin, epibromohydrin, propylene oxide, butene-1 oxide, cis-butene-2 oxide, trans-butene-2 oxide, isobutylene oxide, isopropyl ethylene oxide, etc. In addition, these epoxides can be copolymerized with other epoxides. Of particular importance in the latter case are the copolymers of the 1,2-alkylene oxides with ethylenically unsaturated epoxides such as allyl glycidyl ether, allyl phenyl glycidyl ether, crotyl phenyl glycidyl ether, 1,2-epoxy-5-cyclooctene, etc.

The following examples exemplify the improved results that may be obtained on polymerizing alkylene oxides in accordance with this inveniton. All parts and percentages are by weight unless otherwise indicated. The molecular weight of the polymers produced in these examples is shown by the Reduced Specific Viscosity (RSV) given for each. By the term "Reduced Specific Viscosity" is meant the $\eta$ sp./C. determined on a solution of the polymer in a given diluent. The crystallinity of the polymers was determined by differential thermal analysis (DTA) by the procedure described in Organic Analysis, volume 4, pages 372–383; Interscience Publishers, New York, 1960. In some cases both the initial and the reheat area, in square inches, is given along with the melting point. The area over the DTA curve obtained (20 mg. sample, 20× sensitivity, $9.8°$ C. per hour heating rate), is proportional to the crystalline content. The reheat area refers to melting the sample, cooling and then reheating to measure the area due to crystallinity. A comparison of the reheat area with the initial area shows how well the polymer recrystallizes and thus how stereoregular it is.

EXAMPLES 1–18

In each of these examples a polymerization vessel with a nitrogen atmosphere was charged with 64 parts of n-heptane and 10 parts of propylene oxide. After equilibrating at $50°$ C., a solution of the catalyst was injected. The catalysts in Examples 1–5 were prepared by diluting a 1.5 M solution of triethylaluminum in n-heptane with ether (3 moles per mole of Al), and the specified amount of water was added slowly at $0°$ C. After stirring for 1 hour at $0°$ C., the specified amount of acetylacetone was added slowly and stirring was continued for 16 hours at room temperature. After again cooling to $0°$ C. and diluting with n-heptane to a 0.5 M solution, the alcohol was added slowly and agitation was continued for 16 hours at $30°$ C. In Examples 6–14 the catalysts were prepared by diluting a 1.5 M solution of triethylaluminum in n-heptane to 0.5 M with ether and then reacting this triethylaluminum solution with the specified amount of water and acetylacetone as described above after which the alcohol modifier was added, the solution was agitated at $30°$ C. and then heat-treated for 4 hours at $65°$ C. In Examples 9–14, the modifier was combined with the solution rapidly at $-78°$ C., then warmed to $0°$ C., and agitated at $30°$ C. and heat-treated. In Examples 15–18 the catalysts were prepared as described for Examples 6–14 except that the modifier was added as a gas and the heat treatment step was omitted. The final catalyst solutions were then analyzed for halogen and aluminum to determine the exact composition. In Table I is set forth the catalyst used showing the molar ratio of water and acetylacetone in each case together with the modifying agent and the molar ratio of it. The polymerizations were carried out at $50°$ C. for 19–22 hours, except in the case of Example 3 which was run for 30 hours. Also set forth in Table I is the total percent conversion as indicated by total solids on the reaction mixture.

At the end of the polymerization period the reaction was shortstopped by adding 4 parts of ethanol and then the reaction mixture was diluted with sufficient ether to make the solution of low viscosity for ease of handling. It was then washed with a 3% aqueous solution of hydrogen chloride, then with water until neutral, then with a 2% aqueous solution of sodium bicarbonate and again with water. After adding an amount of Santonox, i.e., 4,4′-thiobis(6-tert-butyl-m-cresol), equal to about 0.5%, based on the polymer, to the reaction mixture, the solvent was evaporated and the polymer was dried. Tabulated below is the percent of polymer isolated along with its RSV as determined on a 0.1% solution in benzene at 25° C. In some instances there is further set forth the melting point in ° C. as determined by Differential Thermal Analysis with the area in square inches. In Example 2 there was an ether-insoluble fraction which was collected, washed twice with ether, once with acetone and then was stabilized by adding 0.1% phenyl β-naphthylamine. This isolated polymer was further separated into a crystalline and amorphous fraction by dissolving the polymer in boiling acetone at 1% concentration and allowing it to crystallize for 16 hours at −30° C. The crystalline polymer was collected, washed twice with acetone at room temperature, and then dried. The acetone-soluble fraction was isolated by evaporating the acetone and drying for 16 hours at 80° C. under vacuum, whereby there was obtained a tacky rubber.

Examples 6–14 and the catalysts used in Examples 35–38 were prepared by the same procedure as described for the catalysts used in Examples 15–18. The polymerizations were carried out at 65° C. for 19–20 hours, except Examples 22, 26, 27 and 33 where the polymerizations were run for 40–42 hours. In Examples 19–34 and 36 the polymer was isolated by diluting the reaction mixture with sufficient ether to decrease the viscosity for ease in handling, then washing it twice with 3% aqueous hydrogen chloride (stirring for 1 hour each time), washing neutral with water and then collecting the insoluble polymer. It was washed twice with ether and once with ether containing 0.05% Santonox as a stabilizer (except Example 28 where phenyl β-naphthylamine was used) and then dried for 16 hours at 80° C. under vacuum. The RSV of the products was determined on a 0.1% solution in tetrachloroethane at 100° C.

In Examples 35, 37 and 38 the polymer was isolated by treating the reaction mixture with about 60 parts of a 60:40:10 toluene:butanol:concentrated hydrochloric acid mixture for 16 hours at 80° C. and then 5 hours at 90° C. After cooling for 16 hours to room temperature, toluene was added and the reaction mixture was washed neutral with water, then with 2% aqueous sodium bicarbonate, and again neutral with water. The toluene-soluble and toluene-insoluble fractions were separated

*Table I*

| Example | Catalyst | Millimoles | Isolated Polymer | | DTA | |
| --- | --- | --- | --- | --- | --- | --- |
| | | | Percent | RSV | M. Pt., ° C. | Area, sq. in. |
| 1 (Control) | (C₂H₅)₃Al·0.5H₂O·0.04A | 4 | 86 | 6.4 | 59 | 0.08 |
| 2 | (C₂H₅)₃Al·0.5H₂O·0.04A·0.5CH₃OH | 4 | 89 | 5.0 | 64 | 0.13 |
| 3 | (C₂H₅)₃Al·0.5H₂O·0.04A·1.0CH₃OH | 4 | 48 | 3.4 | 65 | 0.42 |
| | | | ² 5.7 | | 70 | 0.83 |
| 4 | (C₂H₅)₃Al·0.5H₂O·0.04A·1.0CH₃OH | ¹ 8 | ³ 13 | | 68 | 0.62 |
| | | | ⁴ 57 | 2.5 | | |
| 5 | (C₂H₅)₃Al·0.5H₂O·0.2A·1.0CH₃OH | 4 | 26 | 3.8 | | |
| 6 (Control) | (C₂H₅)₃Al·0.5H₂O·0.5A | 4 | 96 | 9.9 | | |
| 7 | (C₂H₅)₃Al·0.5H₂O·0.5A·1.0 tert-butanol | 4 | 97 | 1.7 | 55 | 0.06 |
| 8 | (C₂H₅)₃Al·0.5H₂O·0.5A·1.0 (2-octanol) | 4 | 98 | 6.3 | 53 | 0.06 |
| 9 | (C₂H₅)₃Al·0.5H₂O·0.5A·1.0 borneol | 4 | 100 | 11.6 | 62 | 0.11 |
| 10 | (C₂H₅)₃Al·0.5H₂O·0.5A·1.0 α-fenchyl alcohol | 4 | 99 | 11.4 | | |
| 11 | (C₂H₅)₃Al·0.5H₂O·0.5A·1.0 α-terpineol | 4 | 100 | 12.8 | | |
| 12 | (C₂H₅)₃Al·0.5H₂O·0.5A·1.0 menthol | 8 | 100 | 11.3 | | |
| 13 | (C₂H₅)₃Al·0.5H₂O·0.5A·1.0 di-tert butyl p-cresol | 4 | 92 | 12.2 | | |
| 14 | (C₂H₅)₃Al·0.5H₂O·0.5A·1.0 phenol | 4 | 50 | 4.3 | | |
| 15 | (C₂H₅)₃Al·0.5H₂O·0.5A·0.55HCl | 3 | 90 | 12.5 | | |
| 16 | (C₂H₅)₃Al·0.5H₂O·0.5A·0.29HF | 4.7 | 45 | 5.6 | | |
| 17 | (C₂H₅)₃Al·0.5H₂O·0.5A·0.55HI | 4 | 100 | 8.6 | | |
| 18 | (C₂H₅)₃Al·0.5H₂O·0.5A·0.8HI | 4 | 100 | 4.4 | | |

¹ Added in two portions.  ² Ether insoluble fraction.  ³ Recrystallized from acetone.  ⁴ Acetone soluble fraction.

EXAMPLES 19–38

In each of these examples a polymerization vessel (nitrogen atmosphere) was charged with 57 parts of n-heptane and 10 parts of cis-butene-2 oxide. After equilibrating at 65° C. the catalyst (8 millimoles based on aluminum except Examples 35 and 36 where 6 and 9.4 millimoles were used, respectively) was added. The catalysts used in Examples 19–34 were prepared by the same procedure as described for the catalysts used in and the toluene-insoluble fraction was washed twice with toluene and once with 0.05% Santonox in toluene and dried for 16 hours at 80° C. under vacuum. The toluene-soluble fraction was stabilized with 0.5% Santonox (assuming a 20% conversion), the toluene was removed and the residue was dried for 16 hours at 80° C. under vacuum.

In Table II are set forth the catalyst used in each case, the percent conversion to soluble and insoluble polymer, the RSV of each and the melting point and crystallinity data as determined by DTA.

Table II

| Example | Catalyst | Isolated Polymer | Percent Conv. | RSV | DTA M. pt., °C. | DTA Area, sq. in. Initial | DTA Area, sq. in. Reheat |
|---|---|---|---|---|---|---|---|
| 19 (Control) | $(C_2H_5)_3Al \cdot 0.5H_2O \cdot 0.5A$ | Insoluble<br>Soluble | 60<br>37 | 18.8<br>0.86 | 143 | 0.34 | 0.05 |
| 20 | $(C_2H_5)_3Al \cdot 0.5H_2O \cdot 0.5A \cdot 0.5CH_3OH$ | Insoluble<br>Soluble | 35<br>28 | 9.8<br>3.1 | | 0.57 | 0.09 |
| 21 | $(C_2H_5)_3Al \cdot 0.5H_2O \cdot 0.5A \cdot 1.0CH_3OH$ | Insoluble<br>Soluble | 18<br>16 | 6.1<br>2.3 | 147 | 0.67 | 0.17 |
| 22 | $(C_2H_5)_3Al \cdot 0.5H_2O \cdot 0.5A \cdot 1.0$ Isopropanol | Insoluble<br>Soluble | 20<br>24 | 5.3<br>0.56 | 147 | 0.87 | 0.41 |
| 23 | $(C_2H_5)_3Al \cdot 0.5H_2O \cdot 0.5A \cdot 1.0$ tert-butanol | Insoluble<br>Soluble | 57<br>30 | 11.9<br>1.6 | 143 | 1.10 | 0.33 |
| 24 | ____do____ | Insoluble<br>Soluble | 65<br>34 | 5.6<br>1.2 | 143 | 0.77 | 0.24 |
| 25 | ____do____ | Insoluble<br>Soluble | 57<br>27 | 7.8<br>0.9 | 145 | 1.48 | 0.31 |
| 26 | $(C_2H_5)_3Al \cdot 0.5H_2O \cdot 0.5A \cdot 1.0$ (L-2-octanol) | Insoluble<br>Soluble | 25<br>47 | 6.6<br>0.68 | 145 | 1.15 | 0.43 |
| 27 | $(C_2H_5)_3Al \cdot 0.5H_2O \cdot 0.5A \cdot 1.0$ (dl-2-octanol) | Insoluble<br>Soluble | 29<br>39 | 6.3<br>0.63 | 146 | 1.33 | 0.76 |
| 28 | $(C_2H_5)_3Al \cdot 0.5H_2O \cdot 0.5A \cdot 1.0$ cyclohexanol | Insoluble<br>Soluble | 36<br>41 | 5.2<br>0.42 | 147 | 1.44 | 0.52 |
| 29 | $(C_2H_5)_3Al \cdot 0.5H_2O \cdot 0.5A \cdot 1.0$ α-terpineol | Insoluble<br>Soluble | 62<br>38 | 6.0<br>0.48 | 143 | 0.82 | 0.19 |
| 30 | $(C_2H_5)_3Al \cdot 0.5H_2O \cdot 0.5A \cdot 1.0$ L-menthol | Insoluble<br>Soluble | 46<br>33 | | 143 | 1.03 | 0.20 |
| 31 | $(C_2H_5)_3Al \cdot 0.5H_2O \cdot 0.5A \cdot 1.0$ α-fenchyl alcohol | Insoluble<br>Soluble | 58<br>42 | 5.5<br>0.23 | 143 | 0.96 | 0.17 |
| 32 | $(C_2H_5)_3Al \cdot 0.5H_2O \cdot 0.5A \cdot 1.0$ borneol | Insoluble<br>Soluble | 74<br>26 | 7.8<br>0.65 | 143 | 1.10 | 0.29 |
| 33 | $(C_2H_5)_3Al \cdot 0.5H_2O \cdot 0.5A \cdot 1.0$ trans-1,2-cyclohexanediol | Insoluble<br>Soluble | 2.8<br>12.4 | 8.7<br>2.2 | 145 | 0.82 | 0.23 |
| 34 | $(C_2H_5)_3Al \cdot 0.5H_2O \cdot 0.5A \cdot 1.0$ di-tert-butyl p-cresol | Insoluble<br>Soluble | 59<br>41 | 7.4<br>0.67 | 142 | 0.77 | 0 |
| 35 | $(C_2H_5)_3Al \cdot 0.5H_2O \cdot 0.5A \cdot 0.55HCl$ | Insoluble<br>Soluble | 56<br>36 | 2.4<br>0.9 | 140 | 1.19 | 0.14 |
| 36 | $(C_2H_5)_3Al \cdot 0.5H_2O \cdot 0.5A \cdot 0.29HF$ | Insoluble<br>Soluble | 41<br>38 | 12.7<br>0.71 | 150 | 0.82 | |
| 37 | $(C_2H_5)_3Al \cdot 0.5H_2O \cdot 0.5A \cdot 0.55HI$ | Insoluble<br>Soluble | 50<br>50 | 1.9<br>0.75 | 142 | 1.45 | 0.19<br>0 |
| 38 | $(C_2H_5)_3Al \cdot 0.5H_2O \cdot 0.5A \cdot 0.8HI$ | Insoluble<br>Soluble | 40<br>42 | 1.7<br>0.44 | 140 | 1.26 | 0.14 |

The crystalline polymer produced in Example 28 was compression molded at 180° C., cooled to 70° C., held at that temperature for 5 minutes and then cooled to room temperature under pressure. It had a tensile strength of 3200 p.s.i., 250% ultimate elongation and modulus of 18,000 p.s.i. The DTA initial area of the molded polymer was 0.26 sq. in. The DTA initial area of the control, Example 19, which was a rubbery material of low crystallinity, was 0.05 sq. in. after molding.

EXAMPLES 39–42

In each of these examples a polymerization vessel with a nitrogen atmosphere was charged with 65 parts of n-heptane and 10 parts of the monomer mixture (96:4 weight ratio in Examples 39 and 40 and 95:5 weight ratio in Examples 41 and 42). After equilibrating at 50° C. the catalyst was added. The catalysts were prepared by the procedure described in Examples 1 and 3. The polymerizations were run for 19–20 hours at 50° C. after which 4 parts of ethanol was added to shortstop the reaction and 1% phenyl β-naphthylamine (based on polymer) was added as stabilizer. In Examples 39–40, the solvent was removed, the residue was dissolved in 500 parts of isopropanol and the polymer was precipitated by adding water. It was collected, washed with 50:50 water:isopropanol, again added phenyl β-naphthylamine, and finally it was dried for 16 hours at 80° C. under vacuum. In Example 41 after adding the stabilizer, the solvent was removed and the product was dried for 16 hours at 80° C. under vacuum. In Example 42 the polymer was isolated and purified as described for Examples 1–34.

In Table III are set forth the catalyst used in each case and the amount thereof, the percent conversion to isolated polymer, its RSV and crystallinity data as determined by DTA.

Table III

| Example | Catalyst | Millimoles | Isolated Polymer Percent | Isolated Polymer RSV | DTA M. Pt., °C. | DTA Area, sq. in. |
|---|---|---|---|---|---|---|
| 39 | PO—APGE (96:4) $(C_2H_5)_3Al \cdot 0.5H_2O \cdot 0.04A$ | 3 | 64 | 7.8 | | |
| 40 | PO—APGE (96:4) $(C_2H_5)_3Al \cdot 0.5H_2O \cdot 0.04A \cdot 1.0CH_3OH$ | 4 | 22 | 3.9 | 72 | 0.28 |
| 41 | PO—AGE (95:5) $(C_2H_5)_3Al \cdot 0.5H_2O \cdot 0.04A$ | 3 | 91 | 6.3 | 58 | 0.03 |
| 42 | PO—AGE (95:5) $(C_2H_5)_3Al \cdot 0.5H_2O \cdot 0.04A \cdot 1.0CH_3OH$ | 4 | 42 | 3.2 | 60 | 0.81 |

EXAMPLE 43

A polymerization vessel with a nitrogen atmosphere was charged with 80 parts of toluene and 10 parts of ethylene oxide. After equilibrating at 30° C. a solution of the catalyst (equal to 4 millimoles of aluminum) was injected. The catalyst was prepared by diluting a 1.5 M solution of tri-n-butylaluminum in n-heptane to 0.5 molar with ether, slowly adding an amount of water equal to 0.5 mole per mole of aluminum at 0° C., stirring at that temperature for 1 hour, adding 0.25 mole of dimethylglyoxime per mole of aluminum and stirring at room temperature for 16 hours. After cooling to 0° C., 1.0 mole of tert-butanol per mole of aluminum was added and the solution was agitated at room temperature for 16 hours and then was heat-treated for 4 hours at 65° C. The polymerization reaction was run for 19 hours at 30° C. after which the polymer product was isolated by precipitation from the reaction mixture with a large volume of water. It was collected, washed once with ether, agitated with an 80:20 ether:methanol mixture containing 0.5% hydrogen chloride, washed neutral with the ether-methanol mixture, then with 0.4% of Santonox in ether and finally was dried for 16 hours at 50° C. under vacuum. The poly(ethylene oxide) so obtained had an RSV of 7.0 as measured on a 0.1% solution in chloroform at 25° C., and amounted to a conversion of 90%.

EXAMPLE 44

A polymerization vessel having a nitrogen atmosphere was charged with 60 parts of methylene chloride and 10 parts of ethylene oxide. After equilibrating at 30° C. an amount of the catalyst solution equal to 4 millimoles of aluminum was injected. The catalyst was prepared by diluting a 1.5 M solution of triisobutylaluminum in n-heptane to 0.5 M with ether, slowly adding an amount of water equal to 0.5 mole per mole of aluminum, agitating for 16 hours at 30° C., adding 0.5 mole, per mole of aluminum, of 2,3-butanedione monooxime dissolved in an equal volume of ether and again agitating for 16 hours at room temperature. After cooling to 0° C., 1.0 mole of cyclohexanol per mole of aluminum was added and the solution was again agitated for 16 hours at room temperature and then was heat-treated for 4 hours at 65° C. The polymerization was run for 19 hours at 30° C. after which the polymer was isolated and purified as described in Example 43. There was thus obtained in high conversion, poly(ethylene oxide) having an RSV of 10.0 as measured on a 0.1% solution in chloroform at 25° C.

EXAMPLE 45

Example 44 was repeated except that 80 parts of toluene was used as the diluent and the catalyst was diisobutylaluminum hydride which had been reacted with 0.5 mole of water, 0.5 mole of diethylmalonate, and 1.0 mole of α-terpineol, the catalyst solution being prepared by the same general procedure as described in Example 44. The poly(ethylene oxide) so obtained amounted to a high conversion and had an RSV of 4.0.

EXAMPLE 46

A polymerization vessel with a nitrogen atmosphere was charged with 36.5 parts of dry toluene, 10 parts of epichlorohydrin and after equilibrating at 65° C., 3.7 millimoles (based on aluminum) of triethylaluminum which had been reacted with 0.5 mole of water, 0.5 mole of acetylacetone and 1.0 mole of borneol prepared as described in Example 9. After 19 hours at 65° C., the polymerization reaction was shortstopped by adding 4 parts of anhydrous ethanol. The polymer product was precipitated by adding ether, collecting the insoluble and washing it once with ether. It was then dispersed in ethanol containing 1% hydrogen chloride, again collected, washed neutral with methanol, then with 0.4% Santonox in methanol, and finally was dried for 16 hours at 80° C. under vacuum. The poly(epichlorohydrin) so obtained was a tough solid amounting to a conversion of 94.7% and had an RSV of 1.7 as measured on a 0.1% solution in α-chloronaphthalene at 100° C. It had a melting point of 120° C. and an initial melt area of 0.94 sq. in. as determined by DTA. The product was further separated into a crystalline and amorphous fraction by dissolving it in boiling acetone and allowing it to crystallize for 16 hours at −30° C. The crystalline fraction so obtained amounted to 70.2% of the total polymer.

In a control run using as the catalyst triethylaluminum reacted with 0.5 mole of water and 0.5 mole of acetylacetone, there was obtained a 95% conversion to a poly(epichlorohydrin) having an RSV of 10.0, and which was a tough, partly crystalline solid.

EXAMPLE 47

Example 46 was repeated except that the monomer charge was 9 parts of epichlorohydrin and 1 part of ethylene oxide and one-half the amount of catalyst was used. After 1 hour at 65° C. the polymerization was stopped and the polymer isolated and purified. There was obtained a 10% conversion of an elastomeric copolymer having an RSV of 4.0 (0.1% solution in α-chloronaphthalene at 100° C.) which on analysis was found to contain 40% ethylene oxide.

What I claim and desire to protect by Letters Patent is:

1. The process of preparing poly(epoxides) which comprises polymerizing epoxides, wherein the epoxy group is an oxirane ring, by contacting at least one of said epoxides with the catalyst formed by reacting an alkyl aluminum compound selected from the group consisting of trialkylaluminum and dialkylaluminum hydride with water in a molar ratio of from about 0.1 to about 1.0 with a chelating agent in a molar ratio of from about 0.01 to about 1.2, and with a modifying agent selected from the group consisting of alcohols containing from 1 to 4 hydroxyl groups, phenols, and hydrogen halides, in a molar ratio of from about 0.5 to about 1.5, the total amount of said water, chelating agent and modifying agent reacted with the alkyl aluminum compound being such that at least some aluminum-to-carbon bonds remain in the catalyst, said epoxides being free of groups other than oxirane groups which are reactive with said organoaluminum compound.

2. The process of claim 1 wherein an epoxide selected from the group consisting of alkylene oxides and epihalohydrins is polymerized.

3. The process of claim 2 wherein an alkylene oxide is homopolymerized.

4. The process of claim 2 wherein an epihalohydrin is homopolymerized.

5. The process of claim 2 wherein an alkylene oxide is copolymerized with an ethylenically unsaturated epoxide.

6. The process of claim 2 wherein an epihalohydrin is copolymerized with an alkylene oxide.

7. The process of claim 3 wherein propylene oxide is polymerized.

8. The process of claim 3 wherein cis-butene-2 oxide is polymerized.

9. The process of claim 4 wherein epichlorohydrin is polymerized.

10. The process of claim 5 wherein propylene oxide is copolymerized with allyl glycidyl ether.

11. The process of claim 5 wherein propylene oxide is copolymerized with allyl phenyl glycidyl ether.

12. The process of claim 6 wherein epichlorohydrin is copolymerized with ethylene oxide.

13. The process of claim 1 wherein the catalyst is formed by reacting triethylaluminum with acetylacetone as the chelating agent and methanol as the modifying agent.

14. The process of claim 1 wherein the catalyst is formed by reacting triethylaluminum wtih acetylacetone as the chelating agent and cyclohexanol as the modifying agent.

15. The process of claim 1 wherein the catalyst is formed by reacting triethylaluminum with acetylacetone as the chelating agent and hydrogen chloride as the modifying agent.

References Cited by the Examiner

UNITED STATES PATENTS

| | | | |
|---|---|---|---|
| 2,156,918 | 5/1939 | Lyons | 260—429 |
| 2,870,100 | 1/1959 | Stewart et al. | 260—2 |
| 2,908,664 | 10/1959 | Belanger et al. | 260—47 |

WILLIAM H. SHORT, *Primary Examiner.*

T. E. PERTILLA, *Assistant Examiner.*

UNITED STATES PATENT OFFICE
CERTIFICATE OF CORRECTION

Patent No. 3,280,045                                October 18, 1966

Edwin J. Vandenberg

It is hereby certified that error appears in the above numbered patent requiring correction and that the said Letters Patent should read as corrected below.

Columns 7 and 8, Table III, seventh column, line 2 thereof, is indistinctly printed, read -- 0.05 --; same seventh column, line 3 thereof, for "0.81" read -- 0.18 --.

Signed and sealed this 12th day of September 1967.

(SEAL)
Attest:

ERNEST W. SWIDER                              EDWARD J. BRENNER
Attesting Officer                                   Commissioner of Patents